United States Patent
Hara et al.

(10) Patent No.: US 10,654,962 B2
(45) Date of Patent: May 19, 2020

(54) ACRYLIC FILM, METHOD FOR PRODUCING SAME, LAMINATE FILM, LAMINATED INJECTION MOLDED ARTICLE, AND METHOD FOR PRODUCING RUBBER-CONTAINING POLYMER

(71) Applicant: Mitsubishi Rayon Co., Ltd., Tokyo (JP)

(72) Inventors: Naomi Hara, Otake (JP); Masato Yamamoto, Otake (JP); Hidehito Shimonaka, Otake (JP); Yuuhei Konokawa, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 599 days.

(21) Appl. No.: 14/426,429

(22) PCT Filed: Sep. 6, 2013

(86) PCT No.: PCT/JP2013/074161
§ 371 (c)(1),
(2) Date: Mar. 6, 2015

(87) PCT Pub. No.: WO2014/038679
PCT Pub. Date: Mar. 13, 2014

(65) Prior Publication Data
US 2015/0240014 A1 Aug. 27, 2015

(30) Foreign Application Priority Data
Sep. 7, 2012 (JP) ................. 2012-197281

(51) Int. Cl.
| | | |
|---|---|---|
| *C08F 265/06* | (2006.01) | |
| *B29C 48/08* | (2019.01) | |
| *B29C 48/00* | (2019.01) | |
| *B32B 27/08* | (2006.01) | |
| *B32B 27/30* | (2006.01) | |
| *C08J 5/18* | (2006.01) | |
| *C08F 2/22* | (2006.01) | |
| *C08L 51/04* | (2006.01) | |
| *C08F 2/00* | (2006.01) | |
| *C08F 222/10* | (2006.01) | |
| *B29K 33/00* | (2006.01) | |
| *B29K 105/00* | (2006.01) | |
| *C08L 33/10* | (2006.01) | |
| *C08L 33/12* | (2006.01) | |
| *C08L 33/08* | (2006.01) | |

(52) U.S. Cl.
CPC .......... *C08F 265/06* (2013.01); *B29C 48/022* (2019.02); *B29C 48/08* (2019.02); *B32B 27/08* (2013.01); *B32B 27/30* (2013.01); *B32B 27/308* (2013.01); *C08F 2/001* (2013.01); *C08F 2/22* (2013.01); *C08F 222/10* (2013.01); *C08J 5/18* (2013.01); *C08L 33/08* (2013.01); *C08L 33/10* (2013.01); *C08L 33/12* (2013.01); *C08L 51/04* (2013.01); *B29K 2033/08* (2013.01); *B29K 2033/12* (2013.01); *B29K 2105/0085* (2013.01); *B32B 2250/02* (2013.01); *C08J 2333/06* (2013.01); *C08J 2351/00* (2013.01); *C08J 2433/12* (2013.01); *Y10T 428/254* (2015.01); *Y10T 428/269* (2015.01)

(58) Field of Classification Search
CPC ....... B32B 27/308; B32B 27/30; B32B 27/08; C08F 222/10; C08F 2/22; C08F 212/08; C08F 220/18; C08F 220/40; C08F 220/20; C08F 220/14; C08F 265/06; C08J 5/18; C08L 51/04; C08L 33/00–26
See application file for complete search history.

(56) References Cited

U.S. PATENT DOCUMENTS

| | | |
|---|---|---|
| 4,150,005 A | 4/1979 | Gehman et al. |
| 5,270,397 A | 12/1993 | Rhein et al. |
| 6,476,148 B1 | 11/2002 | Gross |

(Continued)

FOREIGN PATENT DOCUMENTS

| | | |
|---|---|---|
| CN | 1726238 A | 1/2006 |
| CN | 1732192 A | 2/2006 |

(Continued)

OTHER PUBLICATIONS

Machine translation of JP2002-307519. Retrieved Apr. 10, 2017.*

(Continued)

*Primary Examiner* — Prashant J Khatri
(74) *Attorney, Agent, or Firm* — Morgan, Lewis & Bockius LLP

(57) ABSTRACT

An acrylic film having few fish eyes and a method for producing latex of an acrylic rubber-containing polymer having low amounts of coarse particles, excellent filtering properties, and low filter clogging frequency during a filtration step for removing foreign substances. An acrylic film containing an acrylic rubber-containing polymer and a thickness of 30 to 300 μm, wherein the number of fish eyes that are 0.001 mm$^2$ or greater in size is 130/m$^2$ or fewer when a section having a light transmission rate of 75% or less for light having a wavelength of 400 to 1100 nm was detected as a fish eye A laminate film formed by laminating the acrylic film and a layer of at least one resin selected from thermoplastic resin, thermosetting resin, and photo curable resin. A laminated injection molded article formed by laminating the acrylic film on an injection molded article.

8 Claims, No Drawings

(56) References Cited

U.S. PATENT DOCUMENTS

| | | | | |
|---|---|---|---|---|
| 7,294,399 | B2* | 11/2007 | Wanat | C08L 33/12 428/412 |
| 2006/0052515 | A1 | 3/2006 | Schultes et al. | |
| 2006/0110617 | A1* | 5/2006 | Kitaike | B29C 45/14811 428/522 |
| 2006/0147714 | A1* | 7/2006 | Schultes | C08F 265/04 428/407 |
| 2008/0132627 | A1 | 6/2008 | Schultes et al. | |
| 2008/0281023 | A1 | 11/2008 | Numrich et al. | |
| 2010/0273019 | A1 | 10/2010 | Kitaike et al. | |
| 2012/0295040 | A1 | 11/2012 | Kuki | |

FOREIGN PATENT DOCUMENTS

| | | | |
|---|---|---|---|
| EP | 1582538 | A1 | 10/2005 |
| EP | 2518093 | A1 | 10/2012 |
| EP | 2756950 | A1 | 7/2014 |
| JP | 53-130785 | A | 11/1978 |
| JP | 02-127403 | A | 5/1990 |
| JP | 04-045102 | A | 2/1992 |
| JP | 05-295050 | A | 11/1993 |
| JP | 2000-053841 | A | 2/2000 |
| JP | 2001-139610 | A | 5/2001 |
| JP | 2002307519 | A * | 10/2002 |
| JP | 2003-128735 | A | 5/2003 |
| JP | 2005-255872 | A | 9/2005 |
| JP | 2009-235160 | A | 10/2009 |
| JP | 2009-255555 | A | 11/2009 |
| JP | 2009-270028 | A | 11/2009 |
| JP | 2012-149268 | A | 8/2012 |
| WO | 03/062292 | A1 | 7/2003 |
| WO | 2011/083690 | A1 | 7/2011 |

OTHER PUBLICATIONS

"Aerosol Surfactants". Cytec Solvay Group, (2015); pp. 1-12.*
"Emulsion Polymerization". Polymer Science Learning Center, https://pslc.ws/macrog/emulsion.htm. Retrieved Jan. 24, 2019.*
International Search Report issued in corresponding International Patent Application No. PCT/JP2013/074161 dated Oct. 8, 2013.
Partial Supplementary European Search Report issued in counterpart European Patent Application No. 13835759.5 dated Oct. 7, 2015.
Ikenobe et al., "Resin compositions with good weather resistance and low fish eyes for direct deposition," Database CA [Online] Chemical Abstracts, XP002744938 (2005).
Lovell, ed., "Emulsion Polymerization and Emulsion Polymers," 256-257 (1997).
Communication issued in corresponding European Patent Application No. 13835759.5 concerning third party observations dated May 9, 2019.
Office Action issued in counterpart Chinese Patent Application No. 201710207644.1 dated Feb. 1, 2019.

* cited by examiner

ACRYLIC FILM, METHOD FOR PRODUCING SAME, LAMINATE FILM, LAMINATED INJECTION MOLDED ARTICLE, AND METHOD FOR PRODUCING RUBBER-CONTAINING POLYMER

TECHNICAL FIELD

The present invention relates to an acrylic film, a laminate film, and a laminated injection molded article. The present invention also relates to a method for producing a rubber-containing polymer suitable for use in a film.

BACKGROUND ART

According to emulsion polymerization, the polymerization reaction generally occurs within micelles of a surfactant that are provided by a surfactant. The polymer produced in accordance with a progress of the polymerization is not soluble or hardly soluble in water, but due to an action of a surfactant, it is stably dispersed as fine particles in an aqueous medium without being separated or precipitated from the aqueous medium. Such polymer dispersion is referred to as latex.

If polymer latex is produced by emulsion polymerization, coarse particles with a size of 10 to 100 µm or so in which polymer particles are aggregated are produced in a large amount. Unlike a scale adhered to an inner wall of a reactor or a stirring wall, the coarse particles are included in latex in a dispersed state so that it is incorporated with latex to a step after the polymerization. Once the coarse particles are incorporated in a product, they are known to cause defects that are referred to as "protrusions" (hereinbelow, also referred to as a "fish eye"). For an optical application or an application requiring a decorative property, in particular, coarse particles with a size of several tens of µm or higher become a cause of defects in the product. As such, it is desired to suppress generation of coarse particles with a size of several tens of µm or higher that are produced during polymerization and also to remove the produced coarse particles.

The step for filtering polymer latex is to remove coarse particles that are generated during polymerization from latex or to remove foul substances that are incorporated in a raw polymer material or introduced from an outside during polymerization, and it is an essential step for reducing foreign substances. Hereinbelow, the coarse particles and foul substances are collectively referred to as "foreign substances". When a filter medium mesh for filtering is decreased to reduce foreign substances, the filter medium is easily clogged by the foreign substances, in particular, the coarse particles. Accordingly, the lifetime of a filter medium is shortened so that the production speed inevitably needs to be slowed down and the filter medium replacement frequency is increased. Namely, decreasing the size of a filter medium mesh to reduce foreign substances has a problem that productivity for latex polymer is lowered and also it is no longer possible to continue stable production.

In other words, for producing polymer latex, reducing foreign substances and having simultaneously stable production and enhanced production efficiency are a difficult task to achieve. However, it is strongly desired to have both of them.

According to Patent Document 1, a method of mixing a monomer for polymerization with water and a surfactant and supplying them as an emulsion to a reactor is suggested as a method of suppressing scale during emulsion polymerization. In Patent Document 1, there is a description about an effect of reducing scale which does not pass through 60 mesh among scales adhered on an inner wall of a reactor and a stirring wing and scales contained in latex. However, no mention is made regarding reduction of coarse particles as a cause of protrusions and the filtering property of latex, and thus the problems still remain. In Patent Document 2, a method of reducing acetone insoluble particles with a size of at least 55 µm, which become a cause of fish eye in an acrylic film, is suggested. According to Patent Document 2, fish eyes having a size of 0.4 mm×0.5 mm or more in a film with a thickness of 50 µm were lowered by reducing acetone insoluble particles with a size of at least 55 µm. However, as there is no mention about fish eyes with a smaller size, it cannot be said that the method is sufficient by itself. Furthermore, in Patent Document 3, a method of removing an aggregate as a cause of fish eye by a specific filtering method is suggested. According to Patent Document 3, small fish eyes with a size of at least 25 µm are also reduced in an acrylic film with a thickness of 80 µm. However, as a standard for detecting fish eyes is loose, that is, having a transmission ratio of 50% or less, it is expected to have many fish eyes if the measurement is made with a transmission ratio of 75%. Furthermore, when a filtering mesh is 1 µm like Patent Document 3, the filtering medium is easily clogged so that production efficiency may be lowered. For further reducing fish eyes, it is essential to suppress generation of coarse particle as a cause of fish eye and reduce mesh size during filtration step. It is also essential to establish a method for producing latex with a good filtering property to reduce mesh size.

CITATION LIST

Patent Document

Patent Document 1: JP 05-295050 A
Patent Document 2: JP 2003-128735 A
Patent Document 3: JP 2009-270028 A

DISCLOSURE OF THE INVENTION

Problem to be Solved by the Invention

An object of the present invention is to provide an acrylic film with few fish eyes. Another object of the present invention is to provide a method for producing polymer latex to be a raw material of the film in which the amount of coarse particles is extremely low, and which exhibits an excellent filtering property and has a low filter clogging frequency during a filtration step for removing foreign substances.

Means for Solving Problem

As a result of intensive studies, the inventors of the present invention found that the aforementioned problems can be solved by adopting a specific production method for producing polymer latex. The present invention [1] to [14] shown below was completed accordingly.

[1] An acrylic film containing an acrylic rubber-containing polymer (G) and having a thickness of 30 to 300 µm, in which the number of fish eyes that are 0.001 mm$^2$ or greater in size is 130/m$^2$ or fewer per 1 m$^2$ of the acrylic film when a section having a light transmission ratio of 75% or less for light having a wavelength of 400 to 1100 nm is detected as a fish eye by using a surface inspection device.

[2] The acrylic film described in above [1] in which acetone insolubles amount W1 is 5 to 70% by mass and acetone solubles amount W2 is 95 to 30% by mass in the acrylic film (with the proviso that the sum of W1 and W2 is 100% by mass), the ratio of the alkyl acrylate component in the acetone insolubles is 20% by mass or more, and the ratio of the alkyl methacrylate component in the acetone solubles is 50% by mass or more.

[3] The acrylic film described in above [2] in which the total ratio of the alkyl methacrylate component and the aromatic vinyl compound component is 80 to 0% by mass in the acetone insolubles and the total ratio of the alkyl acrylate component and the aromatic vinyl compound component is 50 to 0% by mass in the acetone solubles.

[4] The acrylic film described in any one of above [1] to [3] in which the acrylic rubber-containing polymer (G) is a polymer produced by a multi-stage polymerization step including the following steps (1) and (2):

(1) a polymerization step in which a first emulsion having a monomer mixture (a) containing 20% by mass or more of alkyl acrylate emulsified in water is supplied to a polymerization vessel to proceed with the first stage polymerization, and (2) a polymerization step in which a second emulsion having a monomer mixture (b) containing 50% by mass or more of alkyl methacrylate emulsified in water is supplied to the polymerization vessel after the first polymerization step to proceed with the final stage polymerization.

[5] A method for producing an acrylic rubber-containing polymer (G) used for an acrylic film, the method including a multi-stage polymerization step including the following steps (1) and (2):

(1) a polymerization step in which a first emulsion having a monomer mixture (a) containing 20% by mass or more of alkyl acrylate emulsified in water is supplied to a polymerization vessel to proceed with the first stage polymerization, and (2) a polymerization step in which a second emulsion having a monomer mixture (b) containing 50% by mass or more of alkyl methacrylate emulsified in water is supplied to the polymerization vessel after the first polymerization step to proceed with the final stage polymerization.

[6] The method for producing an acrylic rubber-containing polymer (G) described in above [5], in which a polymerization step with at least one stage is included between the step (1) and the step (2).

[7] The method for producing an acrylic rubber-containing polymer (G) described in above [5], in which a number average particle diameter of a dispersion phase is 300 μm or less for the first emulsion and the second emulsion, respectively.

[8] A method for producing an acrylic film, the method including a step of obtaining powder of an acrylic rubber-containing polymer (G) after filtration by passing latex of an acrylic rubber-containing polymer (G) produced by the method described in [5] through a filtering medium with 1 to 100 μm mesh and a step of producing a film by melt extrusion of an acrylic resin composition containing the powder of the acrylic rubber-containing polymer (G) from a T die.

[9] A method for producing the acrylic film described in any one selected from the above [1] to [4], the method including a step of obtaining powder of an acrylic rubber-containing polymer (G) after filtration by passing latex of an acrylic rubber-containing polymer (G) produced by the method described in [5] through a filtering medium with 1 to 100 μm mesh and a step of producing a film by melt extrusion of an acrylic resin composition containing the powder of the acrylic rubber-containing polymer (G) from a T die.

[10] A method for producing an acrylic film, the method including a step of producing a film by melt extrusion of an acrylic resin composition containing an acrylic rubber-containing polymer (G), which is produced by the method described in [5], from a T die and a step of sandwiching the film between two pieces selected from a metal roll, a non-metal roll, and a metal belt.

[11] A method for producing the acrylic film described in any one selected from the above [1] to [4], the method including a step of producing a film by melt extrusion of an acrylic resin composition containing an acrylic rubber-containing polymer (G), which is produced by the method described in [5], from a T die and a step of sandwiching the film between two pieces selected from a metal roll, a non-metal roll, and a metal belt.

[12] A laminate film formed by laminating the acrylic film described in any one selected from the above [1] to [4] and a layer of at least one resin selected from a thermoplastic resin, a thermosetting resin, and a photocurable resin.

[13] A laminated injection molded article formed by laminating the acrylic film described in any one selected from the above [1] to [4] on an injection molded article.

[14] A laminated injection molded article formed by laminating the laminate film described in [12] on an injection molded article.

Effect of the Invention

According to the present invention, a film with few fish eyes is provided. Also provided by the present invention is a method for producing polymer latex to be a raw material of the film in which the amount of coarse particles is extremely low, and which exhibits an excellent filtering property and has a low filter clogging frequency during a filtration step for removing foreign substances.

MODE(S) FOR CARRYING OUT THE INVENTION

Acrylic Film

The acrylic film of the present invention is an acrylic film containing the acrylic rubber-containing polymer (G) and it has a thickness of 30 to 300 μm. Further, the number of fish eyes that are 0.001 $mm^2$ or greater in size is 130/$m^2$ or fewer per 1 $m^2$ of the acrylic film when a section having a light transmission ratio of 75% or less for light having a wavelength of 400 to 1100 μm is detected as a fish eye by using a surface inspection device.

The thickness of the acrylic film of the present invention is 30 to 300 μm. As the thickness of the acrylic film is 30 μm or more, it is possible to protect a base for a laminated injection molded article so that a molded article to be obtained can be given with sufficient depth feel. In addition, as the thickness of the acrylic film is 300 μm or less, rigidity suitable for insert- and in-mold molding can be obtained. Furthermore, from these points of view, the thickness of the acrylic film is more preferably 50 μm or more and 200 μm or less.

In the present invention, a section having a transmission ratio of 75% or less for light having a wavelength of 400 to 1100 nm is detected as a fish eye. Since the number of fish eyes is 130 or fewer per 1 $m^2$ of a film even when small defects that are detected according to such stringent conditions are counted as a fish eye, the acrylic film of the present invention has a high-level printing property. Specifically, the acrylic film of the present invention has less printing losses even when gravure printing such as pale color wood grain pattern under a lower printing pressure and metallic and jet-black printing, by which printing losses particularly tend to occur, are performed, and has a high level printing property that is never obtained with an acrylic film in which a rubber-containing polymer known in a related art is used as a raw material.

As a surface inspection device, B-LSC-6276-MR (manufactured by MEC Co., Ltd.) is used.

Acrylic Rubber-Containing Polymer (G)

The acrylic film of the present invention contains the acrylic rubber-containing polymer (G). The acrylic film has, by containing the acrylic rubber-containing polymer (G), suitable flexibility in addition to high transparency and weather resistance that are intrinsic to an acrylic film, and thus it has excellent processability for thermal lamination, or the like.

The acrylic rubber-containing polymer (G) is a polymer which contains an acrylic rubber component in an inner layer and a hard component in an outer layer. The acrylic rubber is rubber obtained by polymerizing alkyl (meth) acrylate or a mixture containing it at 50% by mass or more.

Method for Producing Acrylic Rubber-Containing Polymer (G)

The acrylic rubber-containing polymer (G) is preferably produced by an emulsion polymerization which has a multi-stage polymerization step including the following steps (1) and (2):

(1) a polymerization step in which a first emulsion having a monomer mixture (a) containing 20% by mass or more of alkyl acrylate emulsified in water is supplied to a polymerization vessel to proceed with the first stage polymerization, and (2) a polymerization step in which a second emulsion having a monomer mixture (b) containing 50% by mass or more of alkyl methacrylate emulsified in water is supplied to the polymerization vessel after the first polymerization step to proceed with the final stage polymerization, The method for producing latex of the acrylic rubber-containing polymer (G) includes a step of emulsion polymerization of the monomer mixture (a) and a step of emulsion polymerization of the monomer mixture (b). If necessary, a polymerization step with one or more stages in which the monomer mixture (c) or the like is subjected to emulsion polymerization may be included between those emulsion polymerization steps. Since the production is achieved by emulsion polymerization with two or more stages and a monomer mixture is supplied as an emulsion to a polymerization vessel during polymerization at the first stage and also the final stage, production of coarse particles in finally-obtained latex is suppressed so that a film with few fish eyes can be produced.

Furthermore, it is also possible to include a step for emulsion polymerization of the monomer mixture(s) to have polymer Tg of 70 to 120° C. before the polymerization of the monomer mixture (a).

Hereinbelow, the method for producing latex of the acrylic rubber-containing polymer (G) of the present invention is described in detail. The monomer components are described first and the polymerization method is described later. As described herein, "(meth)acryl" means either "acryl" or "methacryl". Furthermore, a "monomer mixture" means a monomer of one type or two types.

Monomer Mixture (a) and Rubber Polymer (A)

The monomer mixture (a) is a monomer mixture which contains alkyl acrylate at 20% by mass or more on the basis of the total amount of 100% by mass, and it is a monomer mixture to be a raw material of the first stage. According to the first polymerization step for polymerizing the monomer mixture (a) as a raw material, the rubber polymer (A) is produced.

Examples of the alkyl acrylate (hereinbelow, it may be referred to as the "monomer (a1)") include methyl acrylate, ethyl acrylate, propyl acrylate, n-butyl acrylate, 2-ethylhexyl acrylate and n-octyl acrylate. Among them, n-butyl acrylate is preferable. They may be used either singly or in combination of two or more types.

Examples of the monomer other than alkyl acrylate in the monomer mixture (a) include alkyl methacrylate (hereinbelow, it may be referred to as the "monomer (a2)"), a monomer having one double bond which can copolymerize with them (hereinbelow, it may be referred to as the "monofunctional monomer (a3)"), and a polyfunctional monomer (hereinbelow, it may be referred to as the "polyfunctional monomer (a4)").

Examples of the alkyl methacrylate include those in which the alkyl group is either linear or branched. Specific examples of the alkyl methacrylate include methyl methacrylate, ethyl methacrylate, propyl methacrylate and n-butyl methacrylate. They may be used either singly or in combination of two or more types.

Examples of the monofunctional monomer (a3) include acrylic monomers such as lower-alkoxy acrylate, cyanoethyl acrylate, acrylamide, and (meth)acrylic acid; aromatic vinyl monomers such as styrene or alkyl-substituted styrenes; and vinyl cyanide monomer such as acrylonitrile or methacrylonitrile. They may be used either singly or in combination of two or more types.

As for the polyfunctional monomer (a4), a cross-linkable monomer having two or more copolymerizable double bonds in one molecule can be mentioned. Specific examples are as follows: di(meth)acrylate alkylene glycol such as ethylene glycol di(meth)acrylate, 1,3-butylene glycol di(meth)acrylate, 1,4-butylene glycol di(meth)acrylate, or propylene glycol di(meth)acrylate; polyvinylbenezene such as divinylbenzene or trivinylbenzene; a cyanurate monomer such as triallyl cyanurate or triallyl isocyanurate, α,β-unsaturated acid such as allyl methacrylate, or allyl, methallyl, or crotyl ester of dicarboxylic acid. They may be used either singly or in combination of two or more types.

Content of the alkyl acrylate in the monomer mixture (a) is preferably 20 to 99.9% by mass, and more preferably 30 to 99.9% by mass. Content of the alkyl methacrylate in the monomer mixture (a) is preferably 0 to 69.9% by mass. Content of the monofunctional monomer (a3) in the monomer mixture (a) is preferably 0 to 20% by mass. Content of the polyfunctional monomer (a4) in the monomer mixture (a) is preferably 0.1 to 10% by mass.

Glass transition temperature (hereinbelow, referred to as "Tg") of the rubber polymer (A) is preferably 25° C. or less from the viewpoint of flexibility for use in a film or the like, for example. Preferably, it is 0 to −60° C. In the present invention, Tg indicates a value which is calculated from FOX's equation by using the values described in Polymer Hand Book (J. Brandrup, Interscience, 1989). Furthermore, the content of the rubber polymer (A) in the acrylic rubber-containing polymer (G) is preferably 5 to 70% by mass from the viewpoint of film forming property of the acrylic rubber-containing polymer (G) for use in a film or the like, for example.

$$1/(273+Tg)=\Sigma(wi/(273+Tgi))$$

In the above formula, Tg represents glass transition temperature (° C.) of a copolymer, wi represents mass fraction of monomer i, and Tgi represents glass transition temperature (° C.) of a homopolymer which is obtained by polymerization of the monomer i.

Monomer Mixture (b)

The monomer mixture (b) is a monomer mixture which contains alkyl methacrylate at 50% by mass or more on the basis of the total amount of 100% by mass. The monomer mixture (b) is a monomer mixture to be a raw material of the final stage, and it constitutes the outermost layer of the acrylic rubber-containing polymer (G). Tg of the polymer consisting only of the monomer mixture (b) is preferably 70 to 120° C., and more preferably 80 to 100° C. As for the alkyl methacrylate in the monomer mixture (b), at least one monomer which has been exemplified as "the monomer (a2)" in the explanations of the monomer mixture (a) can be used. As for the monomer other than alkyl methacrylate in the monomer mixture (b), alkyl acrylate and a monomer having one double bond which can copolymerize with it (hereinbelow, it may be referred to as the "monofunctional monomer (b3)") can be mentioned. As for the alkyl acrylate, at least one monomer which has been exemplified as "the monomer (a1)" can be used. As for the monofunctional monomer (b3), at least one monomer which has been exemplified as "the monofunctional monomer (a3)" can be used.

Content of the alkyl methacrylate in the monomer mixture (b) is 50 to 100% by mass, preferably 51 to 100% by mass, and even more preferably 60 to 100% by mass. Content of the alkyl acrylate in the monomer mixture (b) is preferably 0 to 20% by mass. Content of the monofunctional monomer (b3) in the monomer mixture (b) is preferably 0 to 49% by mass, and more preferably 0 to 40% by mass.

The use amount of the monomer mixture (b) in the total amount of 100% by mass of a monomer mixture which is used for the entire steps of the polymerization method of the present invention is, from the viewpoint of the film forming property of the acrylic rubber-containing polymer (G) for use in a film or impact resistance of a film obtained by using the acrylic rubber-containing polymer (G) for use as an impact strength modifier, for example, preferably 30 to 95% by mass.

Monomer Mixture (c)

According to the present invention, a step for emulsion polymerization of the monomer mixture (c) may be included between the step for producing the rubber polymer (A) by polymerization of the monomer mixture (a) and the step for polymerizing the monomer mixture (b) in the presence of the rubber polymer (A). Examples of the monomer (c) include a mixture containing 9.9 to 90% by mass of alkyl acrylate, 0 to 90% by mass of alkyl methacrylate, 0 to 20% by mass of other monomer having one double bond copolymerizable with them, and 0.1 to 10% by mass of a polyfunctional monomer. As for the "other monomer" and the "polyfunctional monomer" that are used herein, the monofunctional monomer (a3) and the polyfunctional monomer (a4) which have been described above can be exemplified.

The step for emulsion polymerization of the monomer mixture (c) can be performed with two or more stages. When the polymerization is performed with two or more stages, composition of the monomer mixture (c) may be the same or different from each other. Furthermore, the monomer mixture (c) may contain a surfactant, and it is also possible to mix additionally with water and supply as an emulsion to a polymerization vessel after stirring.

Successive Multi-Stage Emulsion Polymerization

Examples of a method for producing the acrylic rubber-containing polymer (G) include successive multi-stage emulsion polymerization.

As for the method for producing the acrylic rubber-containing polymer (G) by successive multi-stage emulsion polymerization, there is a method in which the monomer mixture (a) for obtaining the rubber polymer (A), water, and a surfactant are admixed with one another, supplied as an emulsion to a polymerization vessel, and polymerized, the monomer mixture (c) is supplied to the polymerization vessel and polymerized therein, and the monomer mixture (b), water, and a surfactant are additionally admixed with one another, supplied as an emulsion to the polymerization vessel, and polymerized. Meanwhile, the step for supplying the monomer mixture (c) to a polymerization vessel is a step which is performed as required.

The polymer product obtained by using the acrylic rubber-containing polymer (G) which has been produced by the aforementioned method has an advantage of having fewer protrusions. When the polymer product is a film, in particular, it is advantageous in that there are only few fish eyes.

Examples of the surfactant used for production by successive multi-stage emulsion polymerization include an anionic, a cationic, and a non-ionic surfactant. They may be used either singly or in combination of two or more types. Examples of the anionic surfactant include rosin soap; potassium oleate; carboxylate salt such as sodium stearate, sodium myristate, sodium N-lauroyl sarcosinate, or dipotassium alkenyl succinate; sulfate ester salt such as sodium lauryl sulfate; sulfonate salt such as sodium dioctyl sulfosuccinate, sodium dodecylbenzene sulfonate, and sodium alkyldiphenyl ether disulfonate; phosphate ester salt such as sodium polyoxyethylene alkyl phenyl ether phosphate or sodium polyoxyethylene alkyl ether phosphate. Specific examples of a commercial product of an anionic surfactant include those with the following trade names: ELEMINOL NC-718 manufactured by Sanyo Chemical Industries, Ltd., PHOSPHANOL LS-529, PHOSPHANOL RS-610NA, PHOSPHANOL RS-620NA, PHOSPHANOL RS-630NA, PHOSPHANOL RS-640NA, PHOSPHANOL RS-650NA, and PHOSPHANOL RS-660NA manufactured by TOHO Chemical Industry Co., Ltd., and LATEMUL P-0404, LATEMUL P-0405, and LATEMUL P-0406, LATEMUL P-0407 manufactured by Kao Corporation.

Examples of the method for preparing an emulsion by mixing a monomer mixture, water, and a surfactant include the following methods (1) to (3). (1) A method of adding a monomer mixture to water followed by addition of a surfactant and sufficient stirring, (2) a method of adding a surfactant to water followed by addition of a monomer mixture and sufficient stirring, and (3) a method of adding a surfactant to a monomer mixture followed by addition of water and sufficient stirring.

As for the mixing device for preparing an emulsion by mixing a monomer mixture with water and a surfactant, a stirrer equipped with a stirring wing; forced emulsifying devices such as homogenizer or homomixer; a device for transport and mixing such as an in-line mixer; and a membrane emulsifying device can be mentioned.

As the emulsion described above, any dispersion like a W/O type in which water droplets are dispersed in a liquid of a monomer mixture and of an O/W type in which liquid droplets of a monomer mixture are dispersed in water can be used. Preferred is an O/W type in which liquid droplets of a dispersion has a number average dispersion particle diameter of 300 µm or less. More preferred is the one with 200 µm or less. Particularly preferred is the one with 100 µm or less. Furthermore, the number average dispersion particle diameter is preferably 0.1 µm or more.

The amount of the surfactant used for preparation of the emulsion is preferably set at 0.5 part by mass or more and 1.6 parts by mass or less relative to the total amount of 100 parts by mass of a monomer mixture in any step of the polymerization. With regard to adjustment of particle size of a polymer by successive multi-stage polymerization, the particle size is generally adjusted according to the use amount of a surfactant during the first stage polymerization step. However, in the present invention, separately from the surfactant added to a monomer mixture, a surfactant may be added to water (aqueous medium) which is added in advance to a polymerization vessel so that the particle size of a rubber-containing polymer can be reduced by use of less amount of a surfactant.

As for the polymerization initiator and chain transfer agent that are used at the time of polymerizing the monomer mixture (a) and the monomer mixture (b) or additionally polymerizing the monomer mixture (c), known compounds can be used. As a method for adding the polymerization initiator and chain transfer agent, a method of adding them to any one of an aqueous phase and a monomer phase or a method of adding them to both phases can be mentioned.

The polymerization initiator is not particularly limited if the purpose of the present invention can be achieved. Examples of the initiator which can be used include organic peroxide, inorganic peroxide, and an azo compound. Specific examples thereof include the followings: organic peroxide such as t-butyl hydroperoxide, 1,1,3,3-teteramehyl butyl hydroperoxide, peroxymaleic acid t-butyl ester, cumene hydroperoxide, or benzoyl peroxide; inorganic peroxide such as potassium persulfate or sodium persulfate; and an azo-based initiator such as azobisisobutyronitrile. They may be used either singly or in combination of two or more types. Those initiators may be used as a common redox-based initiator in combination with a reducing agent like sodium bisulfite, sodium thiosulfate, sodium formaldehyde sulfoxylate, ascorbic acid, hydroxyacetic acid, ferrous sulfate, and a complex between ferrous sulfate and disodium ethylenediamine tetraacetic acid.

Examples of the chain transfer agent include alkyl mercaptan with 2 to 20 carbon atoms, mercaptan acids, thiophenol, and carbon tetrachloride. They may be used either singly or in combination of two or more types. For example, n-octyl mercaptan can be mentioned.

As a method for producing latex of the acrylic rubber-containing polymer (G), there is a method in which a first emulsion in which the monomer mixture (a), water, and a surfactant are mixed and emulsified is supplied to a polymerization vessel for polymerization, the monomer mixture (c) is supplied to the reactor for polymerization, and a second emulsion in which the monomer mixture (b), water, and a surfactant are mixed and emulsified is further supplied to a polymerization vessel for polymerization. In that case, it is preferable that an aqueous solution in the reactor containing ferrous sulfate, disodium ethylenediamine tetraacetate, and sodium formaldehyde sulfoxylate dehydrate be heated to a polymerization temperature and an emulsion containing the monomer mixture (a), water, and a surfactant be supplied to a polymerization vessel.

The polymerization temperature for obtaining latex of the acrylic rubber-containing polymer (G) is, although it may vary depending on an amount or a type of a polymerization initiator or the like, 40 to 120° C. or so, for example.

The latex of the acrylic rubber-containing polymer (G) obtained by the aforementioned method can be treated, if necessary, by using a filtering device equipped with a filtering medium. Examples of the filtering device include the following filtering devices (1) to (3).

(1) a centrifuge type filtering device in which a tubular filtering medium is disposed in a tubular filtering chamber and a stirring wing is disposed within the filtering medium, (2) a filtering device having a tubular element formed of wedge wire with triangular cross section and a scraper which rotates along the outer circumference of the element, and (3) a vibration type filtering device in which a filtering medium exhibits a horizontal circular motion and a vertical amplitude motion relative to a surface of the filtering medium.

Examples of the filtering medium include a web-like mesh, a porous membrane, a membrane filter, a non-woven filter, and a wedge wire screen. A filtering device having a web-like mesh has meshes of the same size so that foreign substances that are larger than the mesh size can be completely removed, and thus desirable. Examples of the mesh material include a resin like nylon and polyester and metal. Among them, from the viewpoint of having non-tearibility, metal is more preferable. As for the filtering device, a vibration type filtering device having a function of preventing clogging of a filtering medium is preferable.

Mesh of the filtering medium for filtering the latex of the acrylic rubber-containing polymer (G) is preferably 1 to 100 µm. As the mesh of a filtering medium decreases, more clogging is caused by coarse particles at the time of filtering latex, thus yielding poor filtration. As such, the mesh of the filtering medium is more preferably 10 µm or more, and more preferably 20 µm or more. Furthermore, once the coarse particles in latex pass through a filtering device, they become a cause of fish eyes in an acrylic film. Thus, the mesh of the filtering medium is more preferably 70 µm or less, and more preferably 60 µm or less.

When the acrylic rubber-containing polymer (G) of the present invention is used in the form of latex, stabilization of the latex can be achieved by adding a surfactant or the like or by modifying the surface of particles of the acrylic rubber-containing polymer (G) by a known method or the like. Accordingly, disruption of a stable dispersion state of the latex, which is caused by chemical, mechanical, or physical stimulation, can be either suppressed or prevented. Examples of the surfactant which is used for such purpose are the same as those described above.

The latex of the acrylic rubber-containing polymer (G) which is obtained as described above can be used for various applications as it remains as latex. It is also possible that, according to a known method like aggregation by salting-out, acid-precipitating aggregation, freeze dry, and spray dry, the acrylic rubber-containing polymer (G) is recovered from the latex followed by drying to be used as powder of the acrylic rubber-containing polymer (G). It is also possible to use is after pelletizing the powder by melt-extrusion. Examples of the applications include a film, a spacer, an anti-blocking agent, a resin additive, particles for cosmetics, a carrier for sustained release, a fiber modifying agent, and an agent for adding functions to a resin or a fiber.

When the acrylic rubber-containing polymer (G) is recovered by an aggregation method based on a salting-out treatment using a metal salt, the content of the residual metals in the acrylic rubber-containing polymer (G) which is finally obtained is preferably 800 ppm or less. Smaller content of the residual metal is more preferable.

When a metal salt having high affinity for water like calcium, magnesium or sodium is used as a metal salt for the aforementioned salting-out treatment, it is preferable that the residual metal content be lowered as much as possible in the acrylic rubber-containing polymer (G). Accordingly, a whitening phenomenon occurring at the time of impregnating an acrylic film in boiling water, for example, can be easily suppressed.

As for the material for forming the acrylic film of the present invention, the acrylic rubber-containing polymer (G) can be used either singly or in combination of two or more types. Furthermore, unlike the acrylic rubber-containing polymer (G), the acrylic rubber-containing polymer (G') which is obtained by a multi stage emulsion polymerization not including a step of preparing an emulsion can be also used in combination. As for the method for producing the acrylic rubber-containing polymer (G'), there can be a method in which the monomer mixture (a) for obtaining the rubber polymer (A), water, and a surfactant are admixed with one another, supplied to a polymerization vessel, and polymerized, the monomer mixture (c) is supplied to a polymerization vessel and polymerized therein, and the monomer mixture (b), water, and a surfactant are additionally admixed with one another, supplied as an emulsion to a polymerization vessel, and polymerized. Meanwhile, the step for supplying the monomer mixture (c) for polymerization to a polymerization vessel is a step which is performed as required.

As for the material for forming the acrylic film, the resin composition (I) in which the thermoplastic polymer (H) and the acrylic rubber-containing polymer (G) are used in combination can be used.

Thermoplastic Polymer (H)

The thermoplastic polymer (H) preferably contains the alkyl methacrylate (H1) unit at 50% by mass or more. The thermoplastic polymer (H) is a polymer containing the alkyl methacrylate (H1) unit having 1 to 4 carbon atoms at 50 to 100% by mass, the alkyl acrylate (H2) unit at 0 to 50% by mass, and at least one of the monomer (H3) unit other than (H1) and (H2), which has a double bond copolymerizable with them, at 0 to 50% by mass, and it is more preferably a polymer having a reduced viscosity is 0.15 L/g or less. By using the thermoplastic polymer (H) in combination, surface hardness and heat resistance (in the case of a construction application, matte-reduction resistance) can be improved. Therefore, Tg of the thermoplastic polymer (H) is preferably 80° C. or higher, and more preferably 90° C. or higher. Meanwhile, the "reduced viscosity" is a value which is determined at 25° C. for a solution of 0.1 g of a polymer dissolved in 100 mL of chloroform.

Examples of the alkyl methacrylate (H1) include methyl methacrylate, ethyl methacrylate, propyl methacrylate and n-butyl methacrylate. Among them, methyl methacrylate is preferable. They may be used either singly or in combination of two or more types.

Examples of the alkyl acrylate (H2) include methyl acrylate, ethyl acrylate, propyl acrylate and n-butyl acrylate. Among them, methyl acrylate is preferable. They may be used either singly or in combination of two or more types.

Examples of the monomer (H3) include aromatic vinyl compounds such as styrene, cyanovinyl monomers such as acrylonitrile, unsaturated dicarboxylic anhydrides such as maleic anhydride or itaconic anhydride, N-phenylmaleimide, and N-cyclohexylmaleimide. They may be used either singly or in combination of two or more types.

Content of the alkyl methacrylate (H1) unit in the thermoplastic polymer (H) is preferably 50 to 100% by mass from the viewpoint of surface hardness and heat resistance (in the case of a construction application, matte-reduction resistance) of an acrylic film. The content is more preferably 80 to 99.9% by mass.

Content of the alkyl acrylate (H2) unit in the thermoplastic polymer (H) is preferably 0 to 50% by mass from the viewpoint of having a film forming property and adequate toughness for insert- and in-mold molding of an acrylic film to be obtained. The content is more preferably 0.1 to 20% by mass.

A reduced viscosity of the thermoplastic polymer (H) is preferably 0.15 L/g or less, and more preferably 0.10 L/g or less from the viewpoint of insert moldability, in-mold moldability and a film forming property of an acrylic resin to be obtained. Furthermore, the reduced viscosity is preferably 0.01 L/g or more, and more preferably 0.03 L/g or more from the viewpoint of a filming forming property.

The method for producing thermoplastic polymer (H) is not particularly limited, and polymerization can be performed by usual suspension polymerization, emulsion polymerization, or bulk polymerization.

Resin Composition (I)

The resin composition (I) suitably used in the acrylic film of the present invention contains the acrylic rubber-containing polymer (G) and the thermoplastic polymer (H). It preferably consists of 1 to 99% by mass of the acrylic rubber-containing polymer (G) and 1 to 99% by mass of the thermoplastic polymer (H). From the viewpoint of molding whitening resistance of an acrylic film to be obtained, the content of the acrylic rubber-containing polymer (G) in the resin composition (I) is more preferably 50% by mass or more, and most preferably 70% by mass or more. The content of the thermoplastic polymer (H) in the resin composition (I) is more preferably 50% by mass or less, and most preferably 30% by mass or less.

Acetone Insolubles and Solubles

The components for constituting the acrylic film of the present invention are preferably as follows: acetone insolubles amount W1 is 5 to 70% by mass and acetone solubles amount W2 is 95 to 30% by mass in the acrylic film, the ratio of an alkyl acrylate component in the acetone insolubles is 20% by mass or more, and the ratio of an alkyl methacrylate component in the acetone solubles is 50% by mass or more. Meanwhile, the sum of W1 and W2 is 100% by mass.

From the viewpoint of obtaining more excellent molding whitening resistance, the acetone insolubles amount W1 in the acrylic film is preferably 5% by mass or more, and more preferably 30% by mass or more. Meanwhile, the method for measuring the acetone insolubles is described below.

From the viewpoint of molding whitening resistance, it is more advantageous to have a larger amount of the acetone insolubles in the acrylic film. However, the acetone insolubles amount is preferably 70% by mass or less as presence of a prepolymer at a certain amount or more is required from the viewpoint of easy moldability.

The ratio of the alkyl acrylate component in the acetone insolubles of the acrylic film is preferably 20% by mass or more from the viewpoint of flexibility.

From the viewpoint of surface hardness and weather resistance, the ratio of the alkyl methacrylate component in the acetone solubles of the acrylic film is preferably 50% by mass or more.

In the acrylic film of the present invention, the total ratio of the alkyl methacrylate component and the aromatic vinyl compound component is 80 to 0% by mass in the acetone insolubles. From the viewpoint of hardness and weather resistance of the acrylic film, the ratio of the alkyl methacrylate component in the acetone insolubles is preferably 30% by mass or more, and more preferably 50% by mass or more. The ratio of the aromatic vinyl compound component in the acetone insolubles is preferably 20% by mass or less from the viewpoint of transparency of the acrylic film.

In the acrylic film of the present invention, the total ratio of the alkyl acrylate component and the aromatic vinyl compound component is 50 to 0% by mass in the acetone solubles. From the viewpoint of flexibility of the acrylic film, the ratio of the alkyl acrylate component in the acetone solubles is preferably 5% by mass or more. The ratio of the aromatic vinyl compound component in the acetone solubles is preferably 20% by mass or less from the viewpoint of transparency of the acrylic film.

The heat deflection temperature of the acrylic film of the present invention is preferably 70° C. or higher. When the heat deflection temperature is 70° C. or higher, it is unlikely to have an occurrence of surface roughness after heating a laminate which has an acrylic film on its surface. Furthermore, when the heat deflection temperature is 80° C. or higher and a laminate obtained after a surface roughening treatment, which is achieved by an embossing processing or the like of acrylic film surface, is subjected to thermal processing, deterioration of a decoration property which is caused by matte-reduction of an embossed surface can be suppressed, and thus it can have a high industrial value.

Additives

The acrylic film of the present invention may contain, as necessary, common additives such as stabilizers, lubricants, processing aids, plasticizers, anti-impact agents, foaming agents, fillers, antibacterial agents, fungicides, mold releasing agent, antistatic agents, coloring agents, ultraviolet absorbing agents and photostabilizers.

In particular, from the viewpoint of protecting a base, it is preferable to add an ultraviolet absorbing agent for providing weather resistance. As an ultraviolet absorbing agent, known ones can be used and also a copolymerization type can be used. A molecular weight of the ultraviolet absorbing agent used is preferably 300 or more, and more preferably 400 or more. An ultraviolet absorbing agent with a molecular weight of 300 or more can be used to prevent mold contamination with the vaporized ultraviolet absorbing agent during vacuum- or press molding in an injection mold. Generally, an ultraviolet absorbing agent with a higher molecular weight can more significantly minimize long-term bleed-out after processing into a film state and thus allow ultraviolet absorbing performance to be maintained for a longer time than that with a lower molecular weight. Furthermore, an ultraviolet absorbing agent with a molecular weight of 300 or more can reduce vaporization of the ultraviolet absorbing agent in the period from extrusion of the acrylic film from a T die to cooling by a cooling roll. Therefore, there may remain an adequate amount of the ultraviolet absorbing agent to exhibit good performance. It also can eliminate the problem that the vaporized ultraviolet absorbing agent is recrystallized and grown over time on a chain suspending the T die over the T die or on an exhaust hood, and finally dropped on a film, leading to defects in the outer appearance of the film.

The type of the ultraviolet absorbing agent is not particularly limited, but benzotriazoles with a molecular weight of 400 or more, or triazines with a molecular weight of 400 or more can be preferably used. Specific examples of the former include TINUVIN 234 (trade name) manufactured by Ciba Specialty Chemicals and ADEKA STAB LA-31 (trade name) manufactured by Asahi Denka Co., Ltd. Specific examples of the latter include TINUVIN 1577 (trade name) manufactured by Ciba Specialty Chemicals.

The addition amount of the ultraviolet absorbing agent is preferably 0.1 to 10 parts by mass per 100 parts by mass of the acrylic rubber-containing polymer (G) or the resin composition (I). From the viewpoint of improving weather resistance of the acrylic film, the addition amount of the ultraviolet absorbing agent is more preferably 0.5 part by mass or more, and most preferably 1 part by mass or more. From the viewpoint of roll contamination during film forming, chemical resistance and transparency of the acrylic film, the addition amount of the ultraviolet absorbing agent is preferably 5 parts by mass or less, and most preferably 3 parts by mass or less.

The photostabilizer may be selected from those well-known in the art, but for improving not only light stability but also chemical resistance of the acrylic film, a radical scavenger such as a hindered amine photostabilizer is preferably used. For example, in the case of adhesion of a hair dressing material on the acrylic film, appearance variation can be significantly improved by the photostabilizer, resulting in higher industrial utility.

The addition amount of the hindered amine photostabilizer is preferably 0.01 to 5 parts by mass per 100 parts by mass of the acrylic rubber-containing polymer (G) or the resin composition (I). From the viewpoint of improving light stability and chemical resistance of the acrylic film, the addition amount of the hindered amine photostabilizer is more preferably 0.1 part by mass or more, and most preferably 0.2 part by mass or more. From the viewpoint of roll contamination during film forming, the addition amount of the hindered amine photostabilizer is preferably 2 parts by mass or less, and most preferably 1 part by mass or less.

These particular ultraviolet absorbing agent and the hindered amine photostabilizer can be combined to provide an acrylic film particularly suitable for vehicle applications.

As for a method of adding the aforementioned additives, there is a method in which additives are supplied together with a component containing the acrylic rubber-containing polymer (G) or the resin composition (I) to an extruder for forming an acrylic film and a method in which a mixture preliminarily prepared by adding the additives to a component containing the acrylic rubber-containing polymer (G) or the resin composition (I) is kneaded and mixed by using various kneaders. Examples of a kneader used in the latter procedure include common single screw extruders, twin screw extruders, Banbury mixers and roll kneaders.

Method for Producing Acrylic Film

The method for molding an acrylic film by using the acrylic rubber-containing polymer (G) is not particularly limited, and examples thereof include a known method including melt extrusion processes such as solution casting, T die method, and inflation method. Among them, from the viewpoint of economical reason, T die method is most preferable.

The acrylic film of the present invention can be produced by a method including a step of obtaining powder of the acrylic rubber-containing polymer (G) after filtration by passing latex of the acrylic rubber-containing polymer (G) through a filtering medium with 1 to 100 μm mesh and a step of producing a film by melt extrusion of an acrylic resin composition containing powder of the acrylic rubber-containing polymer (G) from a T die. Examples of the acrylic resin composition containing powder of the acrylic rubber-containing polymer (G) include the resin composition (I) described above.

The acrylic film of the present invention can be also produced by a method including a step of producing a film by melt extrusion of an acrylic resin composition containing the acrylic rubber-containing polymer (G) from a T die and a step of sandwiching the film between two pieces selected from a metal roll, a non-metal roll, and a metal belt.

Meanwhile, when conducting melt extrusion by T die method, it is also preferable to perform extrusion while filtering an acrylic resin in a molten state by using a screen mesh with 200 mesh or more (=75 μm or less). As for the screen mesh, one screen or two or more screens are used. It is also possible to use two or more screens of a separate type with different mesh.

The acrylic resin composition extruded from a T die is formed into a film by a collector equipped with a cooling roll. The method for cooling the molten resin is not particularly limited, and examples thereof include a method of forming a film by contact with one metal roll; and a method of forming a film by sandwiching between a plurality of metal roll, non-metal roll, and/or metal belt.

For the method of forming a film by cast contact of the molten acrylic resin composition with one metal roll, it is preferable to use a T die having slit width of 1 mm or less from the viewpoint of easily producing an acrylic resin film having specific heating shrinkage rate.

Meanwhile, when a method of forming a film by sandwiching between a plurality of metal roll, non-metal roll, and/or metal belt is used, surface smoothness of an acrylic resin film to be obtained can be improved so that printing losses can be suppressed at the time of performing printing on the acrylic resin film.

Examples of metal rolls include metal mirror touch rolls; and rolls used in a sleeve touch manner consisting of a metal sleeve (metal film pipe) and a molding roll, described in JP 08-155995 or WO 97/28950. Examples of non-metal rolls include touch rolls made of, for example, silicone rubber. Examples of a metal belt include a metal endless belt. A plurality of these metal rolls, non-metal rolls and metal belts may be used in combination.

According to the method of forming a film by sandwiching between a plurality of metal roll, non-metal roll, and/or metal belt as described above, an acrylic resin composition after melt extrusion is sandwiched substantially without a bank (resin deposit) and is plane-transferred substantially without rolling to form a film. When forming a film without forming a bank (resin deposit), an acrylic resin composition is plane-transferred in the course of cooling without rolling, so that a heat shrinkage ratio of the acrylic resin film thus formed can be reduced. As a result, an acrylic resin film having a specific heat shrinkage ratio can be easily produced.

Meanwhile, when a film is formed by using a plurality of metal roll, non-metal roll, and/or metal belt, it is also possible that the surface of at least one of the metal roll, non-metal roll, and metal belt is subjected to a shape processing like emboss processing and matt processing, and then shape transferring is performed on a single surface or both surfaces of the acrylic resin film.

Surface Processing

For giving a decorative property to various bases, the acrylic film of the present invention can be also used after having printing according to a suitable printing method, if necessary. In such case, it is preferable to use an acrylic film having one surface treated by printing. It is also preferable, from the viewpoint of protecting a printed surface and providing a high quality feel to a product, to have the printed surface placed on an adhesion surface of a base resin. Furthermore, when it is used as a substitute for transparent coating for taking advantage of color of a base, the acrylic film can be used in a transparent state. In particular, for an application in which color of a base is preserved, the acrylic film of the present invention is better than a polyvinyl chloride film or a polyester film in terms of transparency, depth feel, and high quality feel.

Furthermore, the acrylic film containing the acrylic rubber-containing polymer (G) of the present invention has few fish eyes in the film, and thus it has less printing losses even when gravure printing such as pale color wood grain pattern under a lower printing pressure and metallic and jet-black printing, by which printing losses particularly tend to occur, are performed, and has a high level printing property that is never obtained with an acrylic film in which a rubber-containing polymer known in a related art is used as a raw material for film.

Furthermore, the acrylic film of the present invention may be used, if necessary, after a matt reduction treatment like embossing processing or coloration processing.

Laminate Film

The acrylic film of the present invention may be used as a laminate film in which a layer of at least one resin selected from a thermoplastic resin, a thermosetting resin, and a photocurable resin is laminated on one surface or both surfaces of the film. Examples of the thermoplastic resin include a polyvinylidene fluoride resin, an ABS resin, an AS resin, a polystyrene resin, a polycarbonate resin, a vinyl chloride resin, an acrylic resin, a polyester resin, and a resin containing them at 50% by mass or more. Examples of the thermosetting resin include a phenol resin, an epoxy resin, a melamine resin, a urea resin, and a resin containing them at 50% by mass or more. Examples of the photocurable resin include a thermoplastic resin having a radical polymerizable unsaturated group in a side chain and a resin containing a photopolymerization initiator.

As a method for obtaining a laminate film, a known method like thermal lamination, dry lamination, extrusion lamination, co-extrusion, and coating can be used.

Laminated Injection Molded Article

The acrylic film or the laminate film of the present invention can be used as a laminated injection molded article which is obtained by lamination on an injection molded article. As a method for obtaining a laminated injection molded article, a known molding method like an insert molding method in which an acrylic film or a laminate film which has been previously subjected to a shape processing is inserted to a mold for injection molding and an in-mold molding method in which extrusion molding is performed in a mold after vacuum molding can be used.

The in-mold molding method is preferable in terms of workability and economical property as it allows performing both film molding and injection molding in one step. The heating temperature is preferably a temperature which is the same or higher than the softening point of the acrylic film. The lower limit of the heating temperature is generally determined by thermal properties of a film or shape of a molded article, but it is generally 70° C. or higher. Furthermore, when the heating temperature is extremely high, the surface appearance of a molded article is deteriorated or poor releasing property is obtained. Thus, although it is determined by thermal properties of a film or shape of a molded article, the upper limit of the heating temperature is generally 170° C. or lower. According to an in-mold molding method, a three dimensional shape is given to a resin material by vacuum molding, and according to melt-integralization of the acrylic film and base resin by injection molding, an acryl-laminated molded article having an acrylic film on a surface layer can be obtained.

Examples of the resin as a base for injection molding with an acrylic film for insert molding or in-mold molding include an ABS resin, an AS resin, a polystyrene resin, a polycarbonate resin, a vinyl chloride resin, an acrylic resin, a polyester resin, and a resin containing them at 50% by mass or more.

If necessary, the acrylic film or laminate film of the present invention may be subjected to a surface treatment for having various functions, and examples thereof include the following treatments: a printing treatment by silk printing or ink jet printing, metal deposition, sputtering, or wet type plating treatment for having metallic feel or preventing reflection, a surface hardening treatment to improve surface hardness, a water-repellent treatment or a treatment for forming photocatalyst layer to prevent fouling, an anti-static treatment for the purpose of preventing dirt adhesion or cutting electromagnetic wave, forming an anti-reflection layer, and an anti-glare treatment.

Examples of an industrial application of the laminated injection molded article which includes an acrylic film or a laminate film of the present invention include the followings: an automobile component like automobile exterior or automobile interior decoration; a constructional component like wall material and window frame; household goods like dishware and toy; a home appliance component like housing for vacuum cleaner, housing for television, and housing for air conditioner; interior component; ship component; and electronic communication device like Personal Computer housing and housing for a cellular phone.

EXAMPLES

Hereinbelow, the present invention is described in greater detail in view of the examples. Meanwhile, "parts" and "%" in Examples and Comparative Examples indicate "parts by mass" and "% by mass", respectively, and abbreviated symbols/abbreviations are as described in Table 1.

Furthermore, each measurement value of Examples was obtained by the method shown below.

[Evaluation 1] Particle Diameter of Dispersion Phase of Emulsion

A single drop of emulsion was added on a preparative glass and the magnification ratio was fixed to a ratio at which at least ten dispersion phase particles can be observed in an observation range using an optical microscope. The number of every dispersion phase particles that can be observed in an observation range was counted, and an approximate particle size of each particle was obtained. Based on the obtained results, the number average dispersion particle diameter (μm) of the dispersion phase was obtained.

[Evaluation 2] Mass Average Particle Diameter of Polymer Particles

A mass average particle diameter of the polymer particles was obtained by measuring the polymer latex, which has been obtained by emulsion polymerization, based on a dynamic light scattering method using a light scattering photometer (FPAR-1000) manufactured by Otsuka Electronics Co., Ltd.

[Evaluation 3] Filtering Property of Latex

The polymer latex which has been obtained by emulsion polymerization was stirred well, and immediately thereafter, 100 g of the latex was weighed and filtered by using a tubular filtering device provided with nylon mesh having 270 mesh (mesh of 54 μm) (KST-47 manufactured by ADVANTEC, effective filtering area of 12.5 cm$^2$). Then, the amount of the latex (g) filtered for 30 seconds was measured. Expression was made in terms of that amount (g/30 seconds).

[Evaluation 4] Amount of Acetone Insolubles in Acrylic Film

1% by mass acetone solution containing 0.5 g of an acrylic film was prepared. After keeping it for 24 hours at room temperature (25° C.), centrifuge was performed at 16000 rpm for 90 minutes to remove the supernatant. The obtained wet product was dried at a reduced pressure (vacuum level of 47 mmHg) at room temperature for 18 hours. When the mass before extraction was Wi (g) and the mass of the dried product is Wd (g), W1(%) calculated according to the following calculation formula was defined as an amount of acetone insolubles.

$$W1(\%) = Wd(g)/Wi(g) \times 100.$$

[Evaluation 5] Analysis of Components

1% by mass acetone solution containing 0.5 g of an acrylic film was prepared. After keeping it for 24 hours at room temperature (25° C.), centrifuge was performed at 16000 rpm for 90 minutes to remove the supernatant. The obtained wet product was dried at a reduced pressure (vacuum level of 47 mmHg) at room temperature for 18 hours. The dried residuals Wp (g) which have been obtained as described above were subjected to pyrolysis gas chromatography to measure the mass Wa (g) of the alkyl acrylate component. "Wa/Wp×100" was determined as the ratio (%) of the alkyl acrylate component in acetone insolubles. Further, acetone was evaporated from the aforementioned supernatant, and dried residuals We (g) which have been obtained after drying at a reduced pressure (vacuum level of 47 mmHg) at room temperature for 18 hours were subjected to pyrolysis gas chromatography to measure the mass Wm (g) of the alkyl methacrylate component. "Wm/Wc×100" was determined as the ratio (%) of the alkyl methacrylate component in acetone solubles.

[Evaluation 6] Number of Fish Eyes

From a 1 m² film having a thickness of 50 μm, a length of 1 m, and a width of 1 m, the number of fish eyes with a size of 0.001 mm² or greater to have a light transmission ratio of 75% or less for light having a wavelength of 400 to 1100 nm was measured by using B-LSC-6276-MR (manufactured by MEC Co., Ltd.).

Example 1

1. Preparation of Monomer Mixture

The compound of a type and an amount shown in Table 2 was injected to each vessel equipped with a stirrer followed by stirring to obtain a monomer mixture.

2. Polymerization Reaction

To a vessel 1 containing the monomer mixture (a-1), 5.8 parts of deionized water and 0.7 part of a surfactant S were added followed by stirring to prepare the first emulsion (a-1e). Part of the emulsion was sampled and the particle diameter of the emulsion dispersion phase was measured and described in Table 3. Next, to a polymerization vessel equipped with a cooler, 147 parts of deionized water and 0.1 part of a surfactant S were added. After raising the temperature to 75° C., a mixture containing 5 parts of deionized water, 0.20 part of sodium formaldehyde sulfoxylate dehydrate, 0.0001 part of ferrous sulfate, and 0.0003 part of EDTA was added all at once to the polymerization vessel. Subsequently, the air inside the polymerization vessel was replaced with nitrogen, and while stirring the mixture under nitrogen atmosphere, the emulsion (a-1e) was added dropwise to the polymerization vessel for 9 minutes. After that, the reaction was additionally continued for 15 minutes to complete the polymerization. As a result, latex of the rubber polymer (A-1) was obtained.

Subsequently, the monomer mixture (c-1) in a vessel 2 was added dropwise to the aforementioned polymerization vessel for 90 minutes. After continuing the reaction for 60 minutes, latex of the polymer (A-1-c-1) was obtained. Furthermore, the monomer mixture (c-2) in a vessel 3 was added dropwise to the aforementioned polymerization vessel for 45 minutes. After continuing the reaction for 60 minutes, latex of the polymer (A-1-c2) was obtained.

Subsequently, to a vessel 4 containing the monomer mixture (b-1), 25 parts of deionized water and 0.3 part of a surfactant S were added followed by stirring to prepare the second emulsion (b-1e). Part of the emulsion was sampled and the particle diameter of the emulsion dispersion phase was measured and described in Table 3. It was then added dropwise to the aforementioned latex for 140 minutes. After continuing the reaction for 60 minutes, latex of the acrylic rubber-containing polymer (G-1) was obtained.

3. Filtration of Latex

By using part of the acrylic rubber-containing polymer (G-1) in the latex, the mass average particle diameter of the polymer particles and the filtering property of the latex were measured, and the results are shown in Table 3. Furthermore, after filtering the latex by using a vibration type filtering device equipped with 270 mesh (average mesh: 54 μm) made of SUS as a filtering medium, it was subjected to salting-out in an aqueous solution containing 3 parts of calcium acetate. After recovery with washing and drying, the rubber-containing polymer (G-1) was obtained in powder form.

4. Production and Evaluation of Film 75 parts of the acrylic rubber-containing polymer (G-1) which has been obtained from above and 25 pars of the thermoplastic polymer (H-1) [MMA/MA copolymer (MMA/MA=99/1 (mass ratio), reduced viscosity ηsp/c=0.06 L/g)] were added with, as an additive, 1.4 parts of "TINUVIN 234" manufactured by Ciba Specialty Chemicals Inc., 0.3 part of "ADK STAB LA-67" manufactured by ADEKA CORPORATION, and 0.1 part of "IRGANOX 1076" manufactured by BASF and admixed with each other by using a Henschell mixer. The mixture was supplied to a degassing type extruder (PCM-30 manufactured by Ikegai Corp.) which has been heated to 240° C. followed by kneading to obtain pellets of the resin composition (I-1). The resulting pellets were dried for 24 hours at 80° C. and, by using a 40 mmφ non-vent screw type extruder (L/D=26) equipped with a T die having a width of 300 mm, the film (F-1) with a thickness of 50 μm was formed as a film at conditions including a cylinder temperature of 200° C. to 240° C., a T die temperature of 250° C., and a cooling roll temperature of 70° C. Then, the amount of acetone insolubles in the film, the ratio of the alkyl acrylate component in the acetone insolubles, the ratio of the alkyl methacrylate component in the acetone solubles, and the number of film fish eyes were measured and described in Table 3.

Example 2

Latex of the acrylic rubber-containing polymer (G-2) was obtained in the same manner as Example 1 except that a monomer mixture shown in Table 2 was used.

By using part of the acrylic rubber-containing polymer (G-2) in the latex, the mass average particle diameter of the polymer particles and the filtering property of the latex were measured, and the results are shown in Table 3.

Furthermore, after filtering the latex by using a vibration type filtering device equipped with 400 mesh (average mesh: 34 μm) made of SUS as a filtering medium, it was subjected to salting-out in an aqueous solution containing 3 parts of calcium acetate. After recovery with washing and drying, the acrylic rubber-containing polymer (G-2) was obtained in powder form.

The film (F-2) with a thickness of 50 μm was formed as a film in the same manner as Example 1 except that 100 parts of the aforementioned acrylic rubber-containing polymer (G-2) were used instead of 75 parts of the acrylic rubber-containing polymer (G-1) and 25 pars of the thermoplastic polymer (H-1). The resulting film was subjected to the same evaluation as Example 1 and the evaluation results shown in Table 3 were obtained. Since latex of the acrylic rubber-containing polymer (G-2) was filtered through a mesh with mesh size of 34 μm, the number of fish eyes was low in the film.

Comparative Example 1

Latex of the acrylic rubber-containing polymer (G'-1) was obtained in the same manner as Example 1 except that, as the monomer mixture (b-1), a monomer mixture in which 57 parts of MMA, 3 parts of MA, 0.248 part of n-OM, and 0.075 part of t-BHP were mixed was used and the monomer mixture was directly added dropwise to a polymerization vessel without being emulsified in water.

By using part of the acrylic rubber-containing polymer (G'-1) in the latex, the mass average particle diameter of the polymer particles and the filtering property of the latex were measured, and the results are shown in Table 3. According to Comparative Example 1, the monomer mixture (b-1) was not prepared as an emulsion so that there are lots of coarse particles in latex, yielding a poor filtering property.

Furthermore, after filtering the latex by using a vibration type filtering device equipped with 270 mesh (average mesh: 54 μm) made of SUS as a filtering medium, it was subjected to salting-out in an aqueous solution containing 3 parts of calcium acetate. After recovery with washing and drying, the acrylic rubber-containing polymer (G'-1) was obtained in powder form.

Next, pellets of the resin composition (I'-1) were obtained in the same manner as Example 1 except that the acrylic rubber-containing polymer (G'-1) was used instead of the acrylic rubber-containing polymer (G-1). The pellets were dried at 80° C. for 24 hours and, according to the same method as Example 1, the film (F'-1) with a thickness of 50 μm was prepared as a film. The resulting film was subjected to the same evaluation as Example 1 and the evaluation results shown in Table 3 were obtained. Since the monomer mixture (b-1) was not supplied as an emulsion to the polymerization vessel, the number of fish eyes was high in the film.

Comparative Example 2

Latex of the acrylic rubber-containing polymer (G'-2) was obtained in the same manner as Example 1 except that the monomer mixture (a-1) was directly added dropwise to a polymerization vessel without being emulsified in water.

By using part of the acrylic rubber-containing polymer (G'-2) in the latex, the mass average particle diameter of the polymer particles and the filtering property of the latex were measured, and the results are shown in Table 3. According to Comparative Example 2, the monomer mixture (a-1) was not prepared as an emulsion so that the filtering property of latex was poor.

Furthermore, after filtering the latex by using a vibration type filtering device equipped with 270 mesh (average mesh: 54 μm) made of SUS as a filtering medium, it was subjected to salting-out in an aqueous solution containing 3 parts of calcium acetate. After recovery with washing and drying, the acrylic rubber-containing polymer (G'-2) was obtained in powder form.

Next, pellets of the resin composition (I'-2) were obtained in the same manner as Example 1 except that the acrylic rubber-containing polymer (G'-2) is used instead of the acrylic rubber-containing polymer (G-1). The pellets were dried at 80° C. for 24 hours and, according to the same method as Example 1, the film (F-2) with a thickness of 50 μm was prepared as a film. The resulting film was subjected to the same evaluation as Example 1 and the evaluation results shown in Table 3 were obtained. Since the monomer mixture (a-2) was not prepared as an emulsion, the number of fish eyes was high in the film.

TABLE 1

| Abbreviated symbols/ abbreviation | Compound name |
|---|---|
| MMA | Methyl methacrylate |
| BA | Butyl acrylate |
| MA | Methyl acrylate |
| AMA | Allyl methacrylate |
| BDMA | 1,3-Butylene glycol dimethacrylate |
| t-BHP | t-Butyl hydroperoxide |
| CHP | Cumene hydroperoxide |
| n-OM | n-Octyl mercaptan |
| Surfactant S | Sodium polyoxyethylene alkyl ether phosphate [product name: PHOSPHANOL RS-610NA, manufactured by TOHO Chemical Industry Co., Ltd.] |
| EDTA | Disodium ethylenediamine tetraacetate |

TABLE 2

| Vessel | Monomer mixture | Example 1 Compound name | Parts by mass | Example 2 Compound name | Parts by mass | Comparative Example 1 Compound name | Parts by mass | Comparative Example 2 Compound name | Parts by mass |
|---|---|---|---|---|---|---|---|---|---|
| Vessel 1 | Monomer mixture (a-1) | MMA | 0.3 | MMA | 0.3 | MMA | 0.3 | MMA | 0.3 |
| | | BA | 4.5 | BA | 4.5 | BA | 4.5 | BA | 4.5 |
| | | AMA | 0.05 | AMA | 0.05 | AMA | 0.05 | AMA | 0.05 |
| | | BDMA | 0.2 | BDMA | 0.2 | BDMA | 0.2 | BDMA | 0.2 |
| | | CHP | 0.025 | CHP | 0.025 | CHP | 0.025 | CHP | 0.025 |
| Vessel 2 | Monomer mixture (c-1) | MMA | 9.6 | MMA | 9.6 | MMA | 9.6 | MMA | 9.6 |
| | | BA | 14.4 | BA | 14.4 | BA | 14.4 | BA | 14.4 |
| | | AMA | 0.25 | AMA | 0.25 | AMA | 0.25 | AMA | 0.25 |
| | | BDMA | 1 | BDMA | 1 | BDMA | 1 | BDMA | 1 |
| | | CHP | 0.016 | CHP | 0.016 | CHP | 0.016 | CHP | 0.016 |
| Vessel 3 | Monomer mixture (c-2) | MMA | 6 | MMA | 6 | MMA | 6 | MMA | 6 |
| | | MA | 4 | BA | 4 | MA | 4 | MA | 4 |
| | | AMA | 0.075 | AMA | 0.075 | AMA | 0.075 | AMA | 0.075 |
| | | CHP | 0.013 | CHP | 0.013 | CHP | 0.013 | CHP | 0.013 |

TABLE 2-continued

| Vessel | Monomer mixture | Example 1 Compound name | Parts by mass | Example 2 Compound name | Parts by mass | Comparative Example 1 Compound name | Parts by mass | Comparative Example 2 Compound name | Parts by mass |
|---|---|---|---|---|---|---|---|---|---|
| Vessel 4 | Monomer mixture (b-1) | MMA<br>MA<br>n-OM<br>t-BHP | 57<br>3<br>0.248<br>0.075 | MMA<br>BA<br>n-OM<br>t-BHP | 55.2<br>4.8<br>0.22<br>0.075 | MMA<br>MA<br>n-OM<br>t-BHP | 57<br>3<br>0.248<br>0.075 | MMA<br>MA<br>n-OM<br>t-BHP | 57<br>3<br>0.248<br>0.075 |
| Rubber-containing polymer | | G-1 | | G-2 | | G'-1 | | G'-2 | |

TABLE 3

| | Example 1 | Example 2 | Comparative Example 1 | Comparative Example 2 |
|---|---|---|---|---|
| Monomer mixture (a-1) | Emulsified | Emulsified | Emulsified | Not emulsified |
| Monomer mixture (b-1) | Emulsified | Emulsified | Not emulsified | Emulsified |
| Mesh of filtering medium (μm) | 54 | 34 | 54 | 54 |
| [Evaluation 1] Particle diameter of dispersion phase of first emulsion (μm) | 50 | 45 | 50 | — |
| [Evaluation 1] Particle diameter of dispersion phase of second emulsion (μm) | 80 | 85 | — | 75 |
| [Evaluation 2] Mass average particle diameter of polymer particles (nm) | 123 | 120 | 125 | 122 |
| [Evaluation 3] Filtering property of latex (g/30 seconds) | 79 | 85 | 54 | 28 |
| [Evaluation 4] Amount of acetone insolubles in acrylic film (%) | 50 | 58 | 53 | 52 |
| [Evaluation 5] Ratio of alkyl acrylate component in acetone insolubles (%) | 32 | 30 | 35 | 34 |
| [Evaluation 5] Ratio of alkyl methacrylate component in acetone solubles (%) | 94 | 90 | 91 | 95 |
| [Evaluation 6] Number of fish eyes (fish eye/m$^2$) | 125 | 83 | 233 | 1285 |

INDUSTRIAL APPLICABILITY

The laminated injection molded article including the acrylic film or the laminate film of the present invention can be applied for an automobile component, a construction material component, household goods, a home appliance component, an interior member, a ship member, a Personal Computer housing, an electronic communication device, or the like.

The invention claimed is:

1. An acrylic film comprising an acrylic rubber-containing polymer (G) and having a thickness of 30 to 300 μm, in which a number of fish eyes that are 0.001 mm$^2$ or greater in size is 130/m$^2$ or fewer per 1 m$^2$ of the acrylic film when a section having a light transmission ratio of 75% or less for light having a wavelength of 400 to 1100 nm is detected as a fish eye by using a surface inspection device,
   wherein the acrylic rubber-containing polymer (G) is obtained by a method comprising multi-stage polymerization steps including the following steps (1) and (2):
   (1) a first stage polymerization step in which a first emulsion having a monomer mixture (a) containing 20% by mass or more of alkyl acrylate emulsified in water is supplied to a polymerization vessel, and
   (2) a second stage polymerization step in which a second emulsion having a monomer mixture (b) containing 50% by mass or more of alkyl methacrylate emulsified in water is supplied to the polymerization vessel after the first polymerization step,
   wherein a number average particle diameter of a dispersion phase is 300 μm or less for the first emulsion and the second emulsion, respectively, and
   an amount of a surfactant used for preparation of the emulsions is set at 0.5 parts by mass or more and 1.6 parts by mass or less relative to the total amount of 100 parts by mass of a monomer mixture in any polymerization steps of the multistage polymerization steps,
   wherein at least one polymerization step (3) is included between the step (1) and the step (2), and the polymerization step (3) does not include an emulsifying step.

2. The acrylic film according to claim 1, wherein an amount of acetone insolubles W1 is 5 to 70% by mass and an amount acetone solubles W2 is 95 to 30% by mass in the acrylic film with the proviso that the sum of W1 and W2 is 100% by mass, a ratio of an alkyl acrylate component in the acetone insolubles is 20% by mass or more, and a ratio of an alkyl methacrylate component in the acetone solubles is 50% by mass or more.

3. The acrylic film according to claim 2, wherein a total ratio of the alkyl methacrylate component and an aromatic vinyl compound component is 80 to 0% by mass in the acetone insolubles and a total ratio of the alkyl acrylate component and an aromatic vinyl compound component is 50 to 0% by mass in the acetone solubles.

4. A laminate film formed by laminating the acrylic film according to claim 1 and a layer of at least one resin selected from a thermoplastic resin, a thermosetting resin, and a photocurable resin.

5. A laminated injection molded article formed by laminating the acrylic film according to claim 1 on an injection molded article.

6. A laminated injection molded article formed by laminating the laminate film according to claim 4 on an injection molded article.

7. The acrylic film according to claim 4, wherein a number average particle diameter of a dispersion phase is 300 μm or less for the first emulsion and the second emulsion, respectively.

8. An acrylic film comprising an acrylic rubber-containing polymer (G) obtained by a method comprising multi-stage polymerization steps including the following steps (1) and (2):
  (1) a first stage polymerization step in which a first emulsion having a monomer mixture (a) containing 20% by mass or more of alkyl acrylate emulsified in water is supplied to a polymerization vessel, and
  (2) a second stage polymerization step in which a second emulsion having a monomer mixture (b) containing 50% by mass or more of alkyl methacrylate emulsified in water is supplied to the polymerization vessel after the first polymerization step,
  wherein a number average particle diameter of a dispersion phase is 300 μm or less for the first emulsion and the second emulsion, respectively, and
  an amount of a surfactant used for preparation of the emulsions is set at 0.5 parts by mass or more and 1.6 parts by mass or less relative to the total amount of 100 parts by mass of a monomer mixture in any polymerization steps of the multistage polymerization steps,
  wherein at least one polymerization step (3) is included between the step (1) and the step (2), and the polymerization step (3) does not include an emulsifying step.

* * * * *